(12) United States Patent
Olsen et al.

(10) Patent No.: US 10,678,060 B2
(45) Date of Patent: Jun. 9, 2020

(54) LASER LINE GENERATION DEVICE HAVING COMBINATION ASPHERIC LENS AND AXICON

(71) Applicant: Fluke Corporation, Everett, WA (US)

(72) Inventors: Timothy Olsen, Milford, NH (US); William John Weidner, Dublin, NH (US); William F. Jackson, Jr., Munsonville, NH (US)

(73) Assignee: Fluke Corporation, Everett, WA (US)

( * ) Notice: Subject to any disclaimer, the term of this patent is extended or adjusted under 35 U.S.C. 154(b) by 127 days.

(21) Appl. No.: 15/794,999

(22) Filed: Oct. 26, 2017

(65) Prior Publication Data

US 2019/0129187 A1    May 2, 2019

(51) Int. Cl.
| | |
|---|---|
| *G02B 27/09* | (2006.01) |
| *G02B 5/00* | (2006.01) |
| *G02B 3/04* | (2006.01) |
| *G02B 17/08* | (2006.01) |
| *G02B 27/20* | (2006.01) |
| *G01C 15/00* | (2006.01) |

(52) U.S. Cl.
CPC ....... *G02B 27/0927* (2013.01); *G01C 15/004* (2013.01); *G02B 3/04* (2013.01); *G02B 5/001* (2013.01); *G02B 17/086* (2013.01); *G02B 27/0955* (2013.01); *G02B 27/20* (2013.01)

(58) Field of Classification Search
CPC .... G02B 27/0927; G02B 3/04; G02B 17/086; G02B 5/001; G02B 27/0955
See application file for complete search history.

(56) References Cited

U.S. PATENT DOCUMENTS

| 8,220,974 B2 * | 7/2012 | Chen | F21V 5/04 |
| | | | 362/255 |
| 8,801,185 B2 * | 8/2014 | Mordaunt | A61B 3/125 |
| | | | 351/219 |
| 8,911,118 B2 * | 12/2014 | Zhang | G02B 19/0028 |
| | | | 362/309 |
| 9,405,101 B2 * | 8/2016 | Asami | G02B 13/0045 |
| 2003/0067690 A1 * | 4/2003 | Terauchi | G01C 15/006 |
| | | | 359/726 |
| 2004/0051982 A1 * | 3/2004 | Perchak | G02B 5/001 |
| | | | 359/831 |

(Continued)

OTHER PUBLICATIONS

European Search Report dated Feb. 26, 2019, for European Application No. 18202483.6, 7 pages.

*Primary Examiner* — Tsion Tumebo
(74) *Attorney, Agent, or Firm* — Seed Intellectual Property Law Group LLP

(57) ABSTRACT

A laser line generation device includes a unitary lens structure and a laser emitter. The unitary lens structure includes an aspheric surface, a conical surface, and a side surface. The conical surface tapers inwardly toward the aspheric surface to an apex of the conical surface that is opposite an interior side of the aspheric surface. In operation, the laser emitter emits light rays toward the unitary lens structure, and the light rays pass through the aspheric surface into the unitary lens structure, reflect off of the conical surface, and exit the lens structure through the side surface. The light rays exiting the unitary lens structure may be substantially perpendicular to the light rays entering the unitary lens structure.

20 Claims, 10 Drawing Sheets

(56) References Cited

U.S. PATENT DOCUMENTS

| | | | |
|---|---|---|---|
| 2007/0019416 A1* | 1/2007 | Han | H01L 33/58 |
| | | | 362/307 |
| 2009/0067179 A1* | 3/2009 | Chaves | F21K 9/61 |
| | | | 362/329 |
| 2010/0309566 A1* | 12/2010 | DeWitt | G02B 5/001 |
| | | | 359/729 |
| 2011/0280017 A1 | 11/2011 | Dang | |
| 2016/0282591 A1* | 9/2016 | Mizusawa | A61B 1/00 |

* cited by examiner

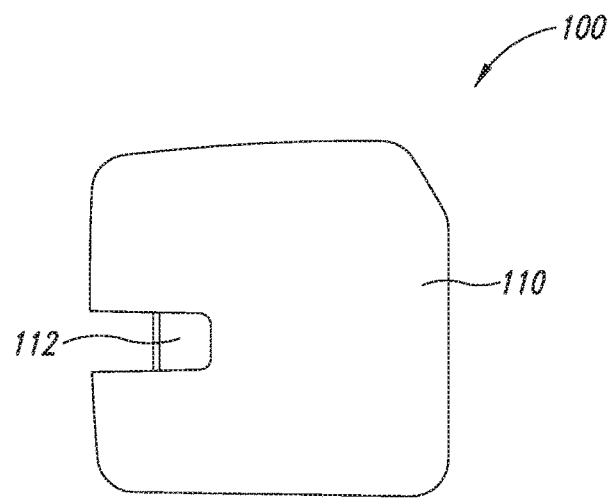
FIG. 2A
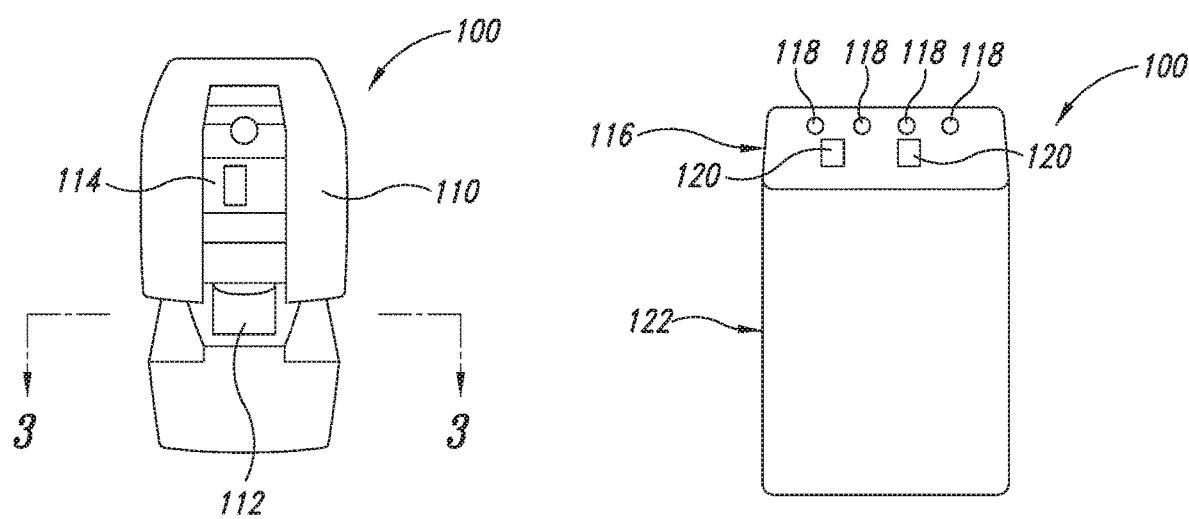
FIG. 2B
FIG. 2C

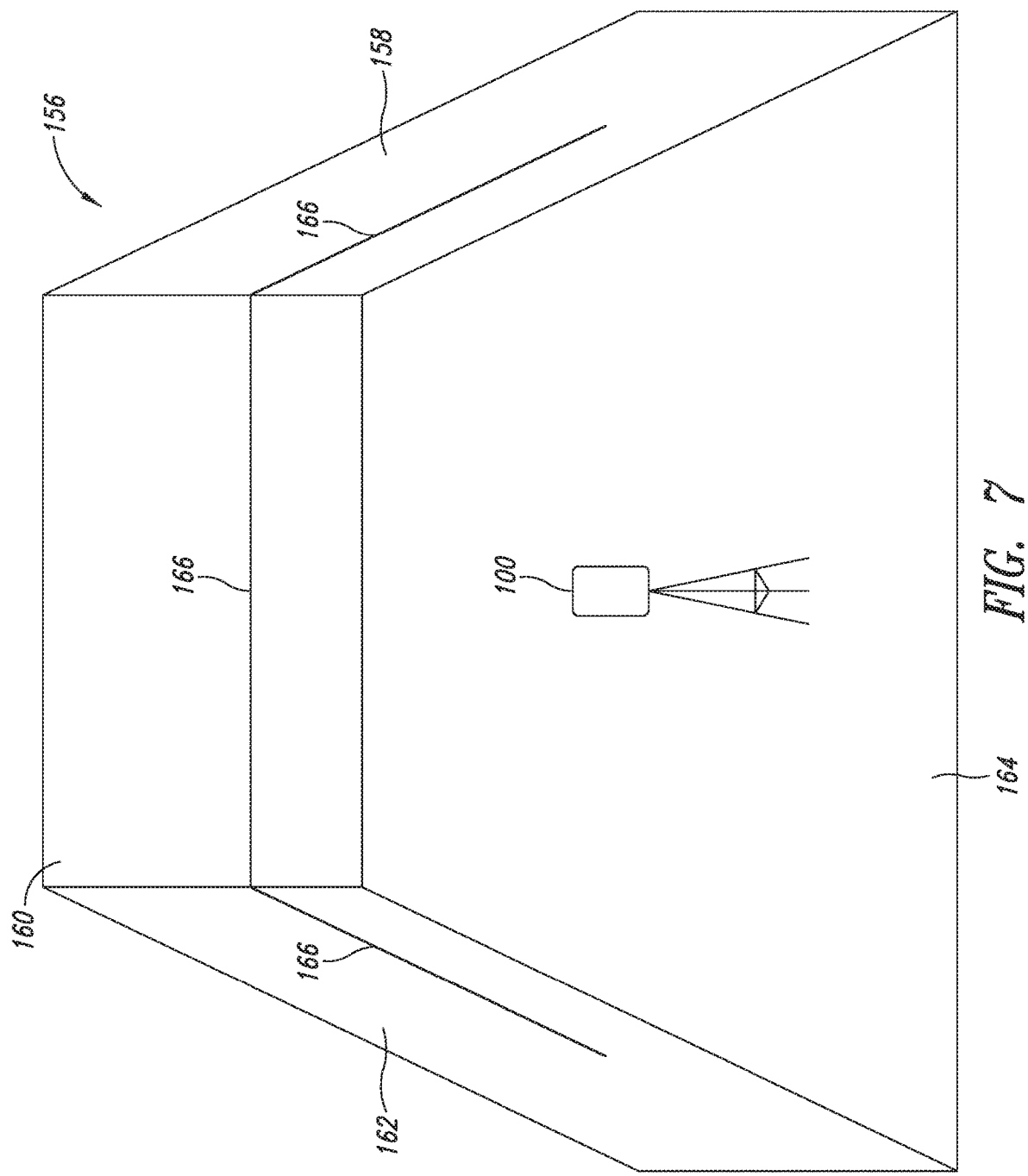

ized as including a unitary lens structure including an aspheric surface, a conical surface, and a side surface, wherein the conical surface tapers inwardly toward the aspheric surface to an apex of the conical surface that is opposite an interior side of the aspheric surface; and a laser emitter which, in operation, emits light rays toward the unitary lens structure, and the light rays pass through the aspheric surface into the unitary lens structure, reflect off of the conical surface, and exit the unitary lens structure through the side surface. The light rays exiting the unitary lens structure through the side surface may be substantially perpendicular to an optical axis of the unitary lens structure. The light rays exiting the unitary lens structure may be substantially perpendicular to the light rays entering the unitary lens structure. The unitary lens structure may collimate the light rays that pass through the aspheric surface, and the collimated light rays may reflect off of the conical surface toward the side surface. The side surface may be a cylindrical surface, and opposite linear portions of the conical surface that meet at the apex of the conical surface may form an angle of 90 degrees. The side surface may have a tapered shape, and opposite linear portions of the conical surface that meet at the apex of the conical surface may form an angle of less than 90 degrees. An optical axis of the unitary lens structure may intersect the apex of the conical surface. An optical axis of the unitary lens structure may not intersect the apex of the conical surface. The unitary lens structure may include an end surface that may extend from the side surface to the conical surface. The unitary lens structure may include a flange disposed between the aspheric surface and the side surface.

LASER LINE GENERATION DEVICE HAVING COMBINATION ASPHERIC LENS AND AXICON

BACKGROUND

Technical Field

The present disclosure relates to optical devices, and more particularly, to laser line generation devices having a unitary lens structure with.

Description of the Related Art

Conventional laser line generation devices typically generate laser lines by passing light rays through lens assemblies that include a plurality of lenses and mirrors. Such lens assemblies can be expensive to manufacture and assemble. The lenses and mirrors included in conventional lens assemblies must be precisely aligned in order to generate laser lines with satisfactory properties. When conventional laser line generation devices are dropped, for example, the lenses and mirrors included in the lens assemblies may become misaligned and the laser lines subsequently generated by those devices can have unsatisfactory properties.

BRIEF SUMMARY

Accordingly, it is desirable to provide laser line generation devices with lens structures that are cheaper to manufacture and assemble than conventional lens structures. In addition, it is desirable to provide laser line generation devices that are more accurate and more reliable than conventional laser line generation devices.

A device may be summarized as including a unitary lens structure including a convex surface, a conical surface, and a side surface, wherein the conical surface tapers inwardly toward the convex surface to an apex of the conical surface that is opposite an interior side of the convex surface, and the side surface surrounds the conical surface; and a light emitter which, in operation, emits light rays toward the unitary lens structure, and the light rays pass through the convex surface into the unitary lens structure toward the conical surface, reflect off of the conical surface toward the side surface, and exit the unitary lens structure through the side surface. The light rays exiting the unitary lens structure through the side surface may be substantially perpendicular to an optical axis of the unitary lens structure. The light rays exiting the unitary lens structure may be substantially perpendicular to the light rays entering the unitary lens structure. The unitary lens structure may collimate the light rays that pass through the convex surface, and the collimated light rays may reflect off of the conical surface toward the side surface. The side surface may be a cylindrical surface, and opposite linear portions of the conical surface that meet at the apex of the conical surface may form an angle of 90 degrees. The side surface may have a tapered shape, and opposite linear portions of the conical surface that meet at the apex of the conical surface may form an angle of less than 90 degrees. An optical axis of the unitary lens structure may intersect the apex of the conical surface. An optical axis of the unitary lens structure may not intersect the apex of the conical surface. The unitary lens structure may include an end surface that may extend from the side surface to the conical surface. The convex surface may be an aspheric surface, and the light emitter may be a laser emitter.

A laser line generation device may be summar-

BRIEF DESCRIPTION OF THE SEVERAL VIEWS OF THE DRAWINGS

FIG. 2A is a side view of a laser line generation device, according to one or more embodiments of the present disclosure.

FIG. 2B is a front view of the laser line generation device shown in FIG. 2A.

FIG. 2C is a rear view of the laser line generation device shown in FIG. 2A, according to one or more embodiments of the present disclosure.

FIG. 7 is diagram showing a laser line generation device in use, according to one or more embodiments of the present disclosure.

DETAILED DESCRIPTION

Figure 1:
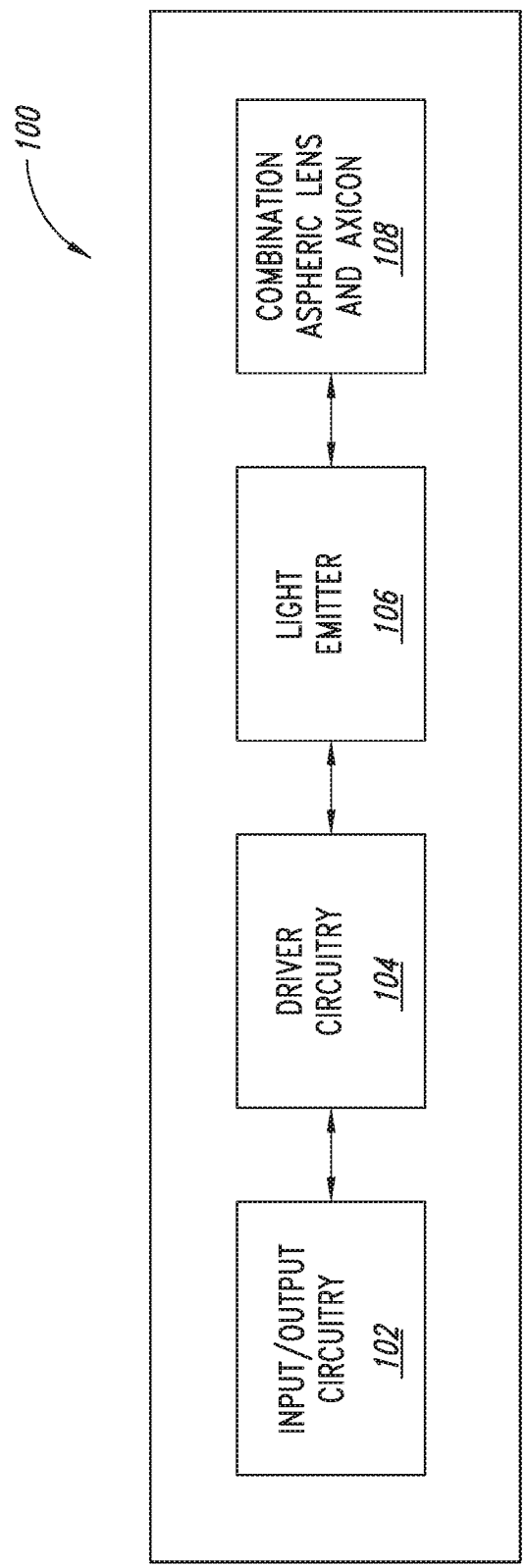
FIG. 1 is a block diagram of a laser line generation device, according to one or more embodiments of the present disclosure.

FIG. 1 is a block diagram of a laser line generation device 100, according to one or more embodiments of the present disclosure. The laser line generation device 100 includes input/output circuitry 102, driver circuitry 104, a light emitter 106, and a combination aspheric lens and axicon 108. The combination aspheric lens and axicon 108 is formed as a unitary lens structure. In other words, the combination aspheric lens and axicon 108 does not include multiple, discrete components. The laser line generation device 100 also includes a power supply (not shown). In one or more embodiments, the power supply includes two AA batteries.

In one or more embodiments, the input/output circuitry 102 includes one or more operator interface elements (e.g., buttons, switches, touch sensors) configured to receive input from an operator, and to control operation of the laser line generation device 100 in accordance with the input from the operator. The input/output circuitry 102 also may include a display screen (e.g., liquid crystal display screen) and/or one or more light emitting diodes (LEDs) that are configured to indicate to an operator a current configuration and/or operating status of the laser line generation device 100.

For example, with reference to FIG. 2C, the input/output circuitry 102 may include an LED 118 and a switch 120 that controls whether power is supplied to the light emitter 106 and the LED 118. When the switch 120 is in a first position, no power is supplied to the LED 118 and the light emitter 106. When the switch 120 is in a second position, power is supplied to the LED 118 and the light emitter 106, which causes the LED 118 and the light emitter 106 to emit light rays. Accordingly, illumination of the LED 118 indicates to an operator that the light emitter 106 is emitting light rays.

Returning to FIG. 1, in one or more embodiments, the driver circuitry 104 includes resistors, preferably configured in a voltage divider configuration, that convert a voltage level output by the power supply into a voltage level appropriate for driving the light emitter 106. In one or more embodiments, the light emitter 106 is a semiconductor laser diode that produces visible light rays having a wavelength between 510-530 nanometers. The light emitter 106 may produce light rays having other wavelengths without departing from the scope of the present disclosure.

The combination aspheric lens and axicon 108 has properties of both an aspheric lens and an axicon. The combination aspheric lens and axicon 108 will be described in greater detail below with reference to FIGS. 4A, 4B, 5, and 6. In addition, a combination aspheric lens and axicon 108' will be described in greater detail below with reference to FIGS. 8A, 8B, 9, and 10.

FIG. 2A is side view of the laser line generation device 100, according to one or more embodiments of the present disclosure. The laser line generation device 100 includes a device housing 110 in which the input/output circuitry 102, the driver circuitry 104, the light emitter 106, and the combination aspheric lens and axicon 108 are disposed. As will be explained in detail below, the light emitter 106 emits light rays that pass through the combination aspheric lens and axicon 108 before exiting the laser line generation device 100 through a transparent window 112.

FIG. 2B is a front view of the laser line generation device 100. In one or more embodiments, the laser line generation device 100 includes a second light emitter (not shown) and a second lens structure including a combination aspheric lens and axicon (not shown), which may have the same configurations as the light emitter 106 and the second combination aspheric lens and axicon 108, respectively, and a second window 114, wherein the second light emitter emits light rays that pass through the second combination aspheric lens and axicon before exiting the laser line generation device 100 through the second transparent window 114. A laser line formed by the second light emitter and the second combination aspheric lens and axicon is perpendicular to a laser line formed by the first light emitter 106 and the first combination aspheric lens and axicon 108. Accordingly, a laser line generation device 100 having the above configuration can generate a first laser line that is a plumb line (i.e., vertical line) and a second laser line that is a level line (i.e., horizontal line), which is perpendicular to the plumb line.

FIG. 2C is a rear view of a laser line generation device 100, according to one or more embodiments of the present disclosure. In one or more embodiments, the laser line generation device 100 includes an operator interface panel 116 with a plurality of LEDs 118 and a plurality of switches 120, which are part of the input/output circuitry 102 described above. A removable panel 122 is provided at the rear of the laser line generation device 100. The panel 122 may be removed from the laser line generation device 100 in order to access a battery compartment. Subsequently, after batteries have been installed in the battery compartment, the panel 122 may be re-attached to the laser line generation device 100.

Figure 3:
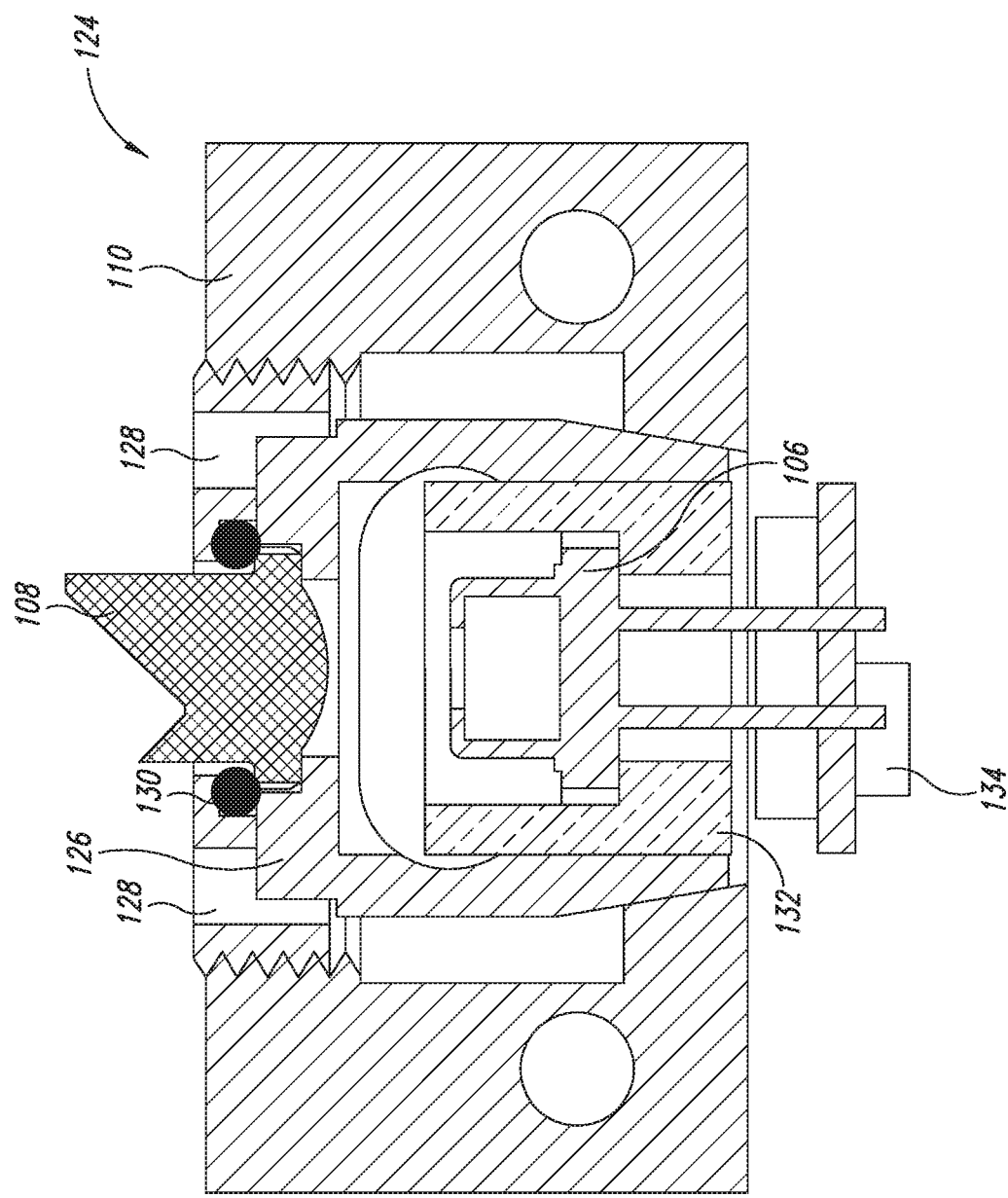
FIG. 3 is a sectional view of a portion of a laser line generation device, according to one or more embodiments of the present disclosure.

FIG. 3 is a sectional view of a portion 124 of the laser line generation device 100 taken along the line 3-3 in FIG. 2B, according to one or more embodiments of the present disclosure. A lens housing 126 is disposed within the device housing 110. The combination aspheric lens and axicon 108 is secured to the lens housing 126 using a pair of retainers 128. Alternatively, the combination aspheric lens and axicon 108' described below (see FIGS. 8A and 8B) is secured to the lens housing 126 using the retainers 128. An O-ring 130 is disposed between the lens housing 126 and the retainers 128. The O-ring 130 helps to keep dirt and moisture, for example, out of the lens housing 126. The light emitter 106 is disposed on a light emitter mount 132, and is coupled to a printed circuit board 134. In one or more embodiments, the driver circuitry 104 is provided on the printed circuit board 134.

Figure 4A:
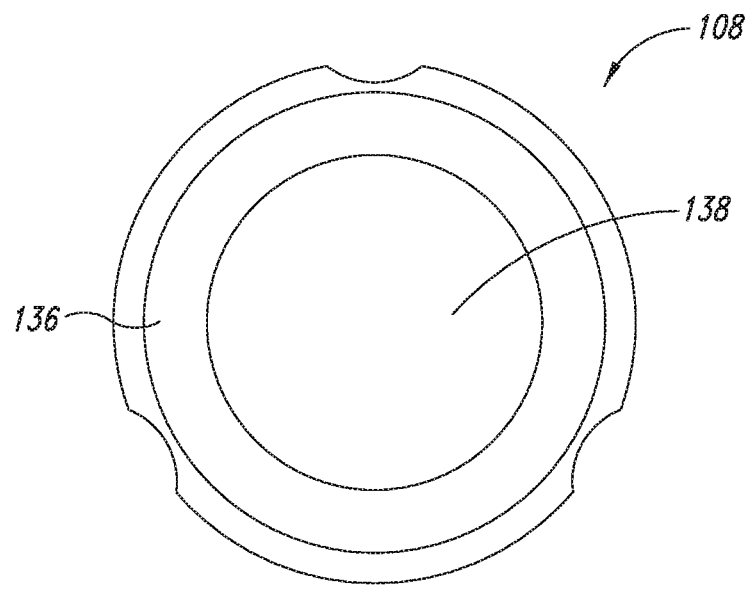
FIG. 4A is a front view of a unitary lens structure including a combination aspheric lens and axicon, according to one or more embodiments of the present disclosure.

FIG. 4A is a front view of a combination aspheric lens and axicon 108, according to one or more embodiments of the present disclosure. An annular flange 136 is disposed about the outer periphery of the combination aspheric lens and axicon 108, near the front of the combination aspheric lens and axicon 108. A convex surface 138 is provided at the front of the combination aspheric lens and axicon 108.

Figure 4B:
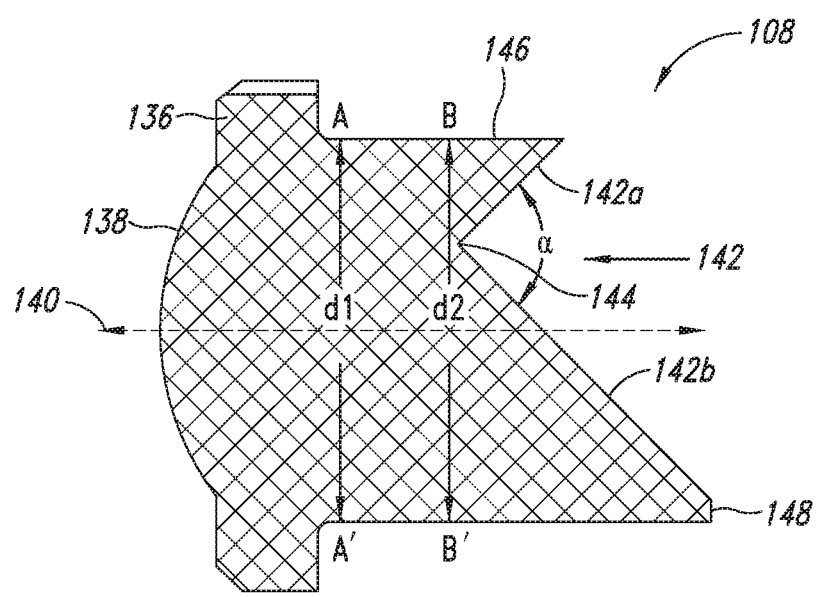
FIG. 4B is a cross-sectional view of the lens structure including the combination aspheric lens and axicon shown in FIG. 4A, according to one or more embodiments of the present disclosure.

FIG. 4B is a cross-sectional view of the combination aspheric lens and axicon 108 shown in FIG. 4A. The combination aspheric lens and axicon 108 has an optical axis 140, which passes through the center of the convex surface 138. A conical surface 142 is disposed opposite the convex surface 138. In general, a conical surface is formed by a set of line segments connecting a common point, which is called an apex, to all points on a base that is in a plane that does not contain the apex, wherein half of such a surface on one side of the apex is called a nappe. In one or more embodiments, the conical surface 142 is in the shape of a nappe.

The conical surface 142 smoothly tapers inwardly from the rear of the combination aspheric lens and axicon 108 toward the convex surface 138 to an apex 144 of the conical surface 138 that is opposite an interior side of the convex surface 138. An angle α is formed between opposite linear portions of the conical surface 142 that meet at the apex 144. For example, the angle α is formed between a first linear portion 142a and a second linear portion 142b of the conical surface 142 that meet at the apex 144, wherein the first linear portion 142a and the second linear portion 142b are opposite one another. In one or more embodiments, a length of the first linear portion 142a is less than a length of the second linear portion 142b of the conical surface 142. In one or more embodiments, the optical axis 140 does not intersect the apex 144 of the conical surface 142.

A side surface 146 is disposed surrounding the conical surface 142. For purposes of the discussion that follows, assume that points A, A', B, and B' are disposed on the side surface 142. Also, assume the point A' is opposite the point A with respect to the optical axis 140, and the point B' is opposite the point B with respect to the optical axis 140. In addition, assume d1 is the distance between the points A and A', and d2 is the distance between the points B and B'. In one or more embodiments, the side surface 146 is a cylindrical surface, wherein the distance d1 between the points A and A' is equal to the distance d2 between the points B and B'. In one or more embodiments, the side surface 146 is a tapered surface, wherein the distance d1 between the points A and A' is greater than the distance d2 between the points B and B'. In one or more embodiments, the side surface 146 is a tapered surface, wherein the distance d1 between the points A and A' is less than the distance d2 between the points B and B'.

In one or more embodiments, the side surface 146 is a cylindrical surface, and the angle α is equal to 90 degrees. In one or more embodiments, the side surface 146 is a tapered surface, and the angle α is less than 90 degrees (e.g., 88.17 degrees).

In one or more embodiments, the convex surface 138 is an aspheric surface 138 having a shape, according to Equation 1, shown below.

$$Z = \left[\frac{(C \cdot X^2)}{1 + \sqrt{1 - (K+1) \cdot C^2 \cdot X^2}}\right] + A_2 \cdot X^2 + A_4 \cdot X^4 + A_6 \cdot X^6 + \cdots + A_n \cdot X^n$$

In Equation 1 shown above, Z is a direction that is parallel to the optical axis 140. C is equal to one divided by the radius of curvature of the aspheric surface 138. K is equal to negative e squared, where e is the eccentricity of the aspheric surface 138. In one or more embodiments, the aspheric surface 138 is formed using Equation 1, wherein C=0.35626, K=0, A2=0, A4=0.0037557, A4=0.0037557, A6=−0.00093685, A8=5.52479×10$^{-5}$, and A10=A12=A14=A16=0.

In one or more embodiments, the combination aspheric lens and axicon 108 is a monolithic, unitary structure formed from a solid block of acrylic using a diamond turning process. In one or more embodiments, alternative the combination aspheric lens and axicon 108 is a monolithic, unitary structure formed from polyester (e.g., OKP Optical Plastic) using an injection molding process.

Figure 5:
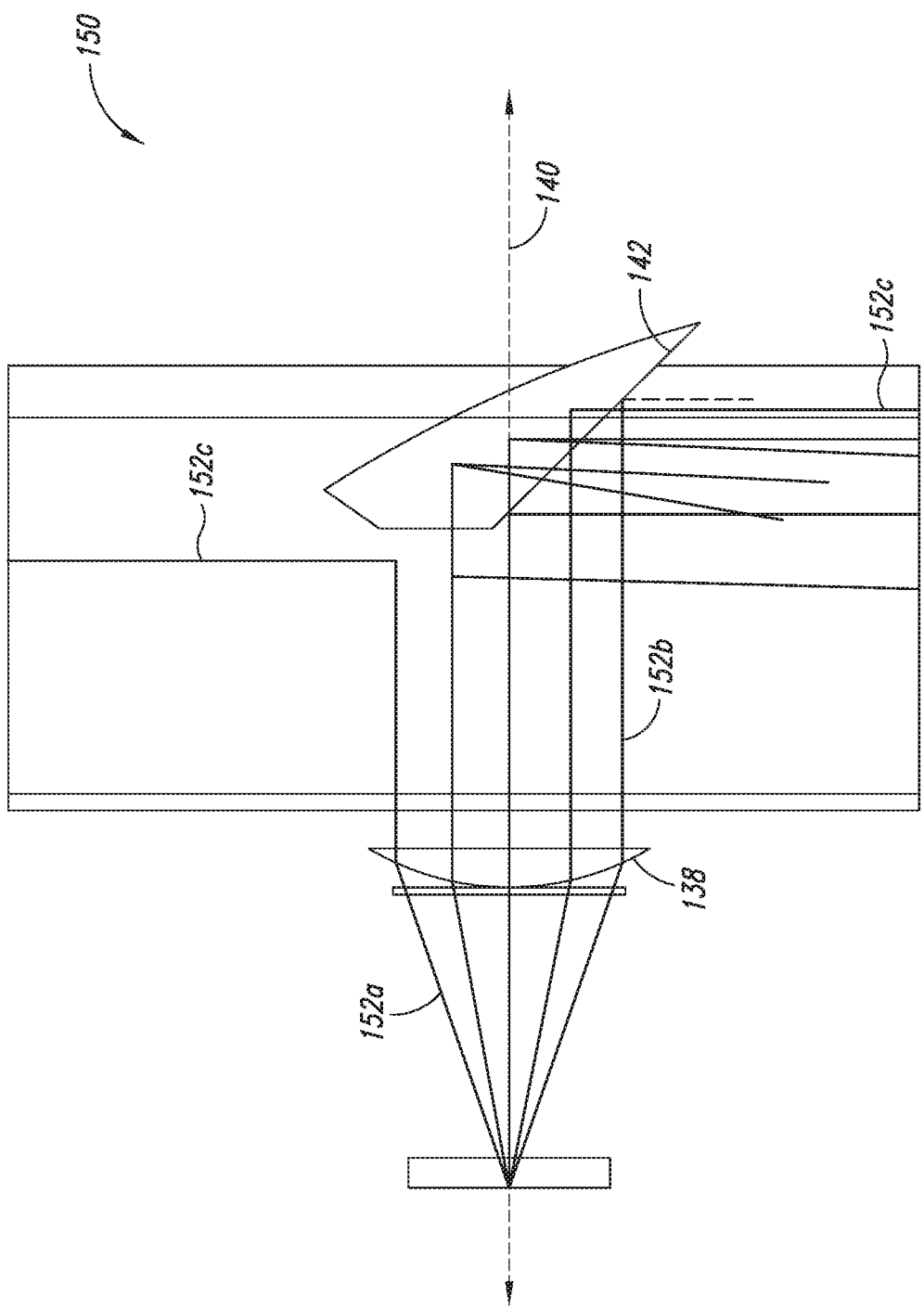
FIG. 5 is an optical model of a lens structure including a combination aspheric lens and axicon, according to one or more embodiments of the present disclosure.

FIG. 5 is a two-dimensional optical model 150 of the combination aspheric lens and axicon 108, according to one or more embodiments of the present disclosure. The optical model 150 includes light rays 152a, which are emitted by the light emitter 106. The light rays 152a pass through the convex surface 138 into the combination aspheric lens and axicon 108 where they are collimated, and parallel or collimated light rays 152b travel toward the conical surface 142 and are reflected off of the conical surface 142 toward the side surface 146 (not shown in FIG. 5). Reflected light rays 152c exit the combination aspheric lens and axicon 108 through the side surface 146 (not shown in the optical model 150), and then exit the laser line generation device 100 through the window 112. In one or more embodiments, the light rays emitted by the light emitter 106 experience total internal reflection within the combination aspheric lens and axicon 108.

In one or more embodiments, the light rays 152c exiting the combination aspheric lens and axicon 108 (and exiting the laser line generation device 100) are substantially perpendicular to the optical axis 140 of the combination aspheric lens and axicon 108. For example, the light rays 152c exiting the combination aspheric lens and axicon 108 and the optical axis 140 preferably form an angle of 90 degrees, plus or minus 0.1 degree. More preferably, the light rays 152c exiting the combination aspheric lens and axicon 108 and the optical axis 140 form an angle of 90 degrees, plus or minus 0.01 degree. Still more preferably, the light rays 152c exiting the combination aspheric lens and axicon 108 and the optical axis 140 form an angle of 90 degrees.

In one or more embodiments, the light rays 152c exiting the combination aspheric lens and axicon 108 (and exiting the laser line generation device 100) are substantially perpendicular to the light rays 152a entering the combination aspheric lens and axicon 108. For example, the light rays 152c exiting the combination aspheric lens and axicon 108 and the light rays 152a entering the combination aspheric lens and axicon 108 preferably form an angle of 90 degrees, plus or minus 0.1 degree. More preferably, the light rays 152c exiting the combination aspheric lens and axicon 108 and the light rays 152a entering the combination aspheric lens and axicon 108 form an angle of 90 degrees, plus or minus 0.01 degree. Still more preferably, the light rays 152c exiting the combination aspheric lens and axicon 108 and the light rays 152a entering the combination aspheric lens and axicon 108 form an angle of 90 degrees.

Figure 6:
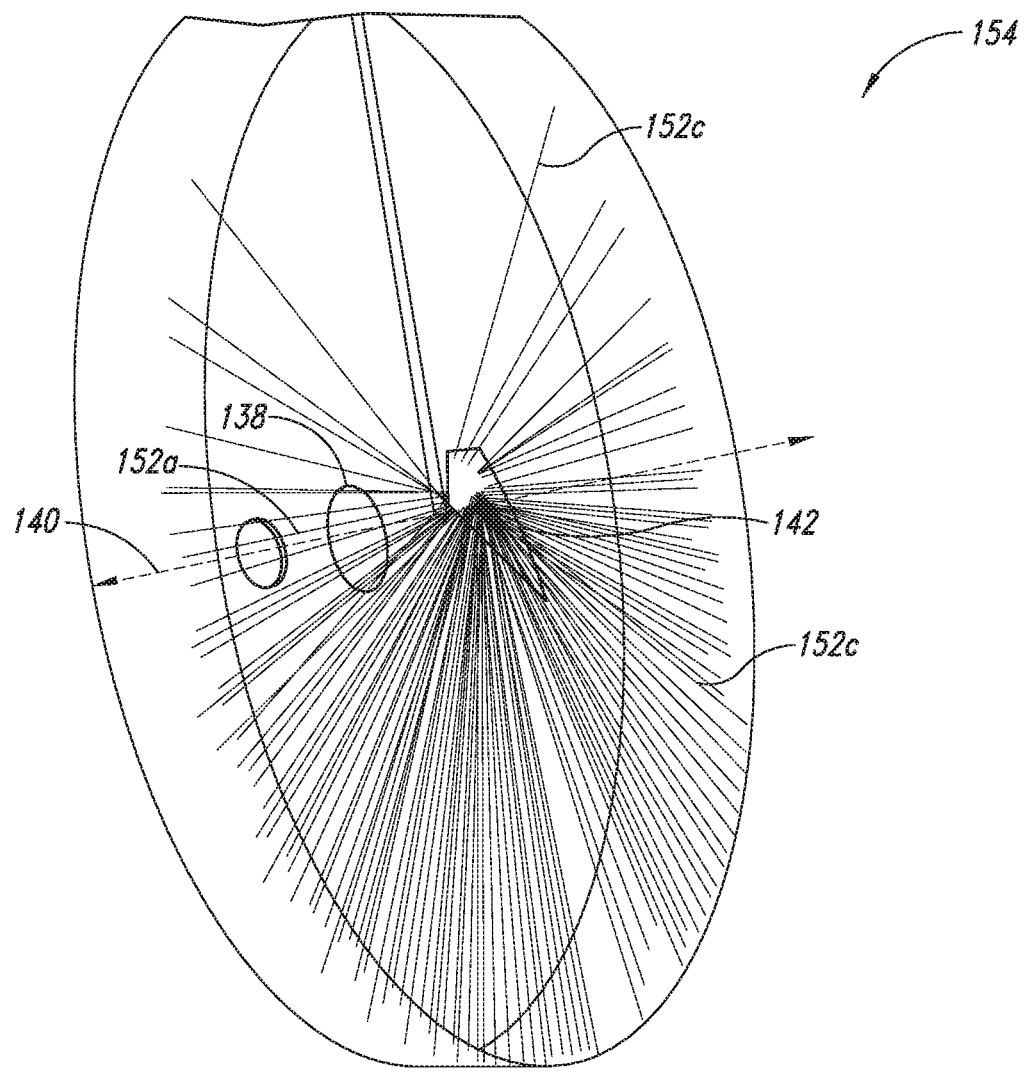
FIG. 6 is another optical model of a lens structure including a combination aspheric lens and axicon, according to one or more embodiments of the present disclosure.

FIG. 6 is a three-dimensional optical model 154 of the combination aspheric lens and axicon 108, according to one or more embodiments of the present disclosure. The optical model 154 is similar in many relevant respects to the optical model 150 shown in FIG. 5. The light rays 152c exiting the combination aspheric lens and axicon 108 travel outwardly in a radial direction from the optical axis 140 as a fan beam. In one or more embodiments, the light rays 152c exiting the combination aspheric lens and axicon 108 span an angular field of view that is slightly larger than 180 degrees. As will be explained below in connection with FIG. 7, the light rays 152c exiting the combination aspheric lens and axicon 108 form a laser line 166 (not shown in FIG. 6), for example, on walls of a room in which the laser line generation device 100 is used.

FIG. 7 is diagram showing a laser line generation device 100 in use, according to one or more embodiments of the present disclosure. The laser line generation device 100 is used in a room 156 having a first wall 158, a second wall 160, a third wall 162, and a floor 164. The laser line generation device 100 is shown mounted to a tripod. For example, the tripod includes a mounting platform with a bolt that extends upwardly, which an operator screws into a threaded aperture formed in a bottom surface of the laser line generation device 100. The operator provides input to the operator interface panel 116 that causes the laser line generation device 100 to turn on and also causes the light emitter 106 to emit light rays. The light rays emitted from the light emitter 106, which pass through the combination aspheric lens and axicon 108 and exit the laser line generation device 100 from the window 112, as described above, form the laser line 166 on the first wall 158, the second 160, and the third wall 162. After the operator has finished using the laser line 166 formed on the walls 158, 160, and 162, the operator provides input to the operator interface panel 116 that causes the laser line generation device 100 to turn off and also causes the light emitter 106 to stop emitting light rays.

Assuming the laser line generation device 100 is level, the laser line 166 also is level (i.e., horizontal). In one or more embodiments, the combination aspheric lens and axicon 108 is self-leveling within a predetermined range of inclinations (e.g., plus or minus four degrees from level). By way of example, an operator of the laser line generation device 100 can use the laser line 166 as a reference line while installing windows in the first wall 158, the second wall 160, and the third wall 162, so that the operator can ensure that the bottoms of the windows are level with one another. Assuming the floor 164 also is level, the laser line 166 is parallel to the floor 164. In one or more embodiments, the accuracy of the laser line 166 is plus or minus 3 millimeters (or less) at a distance of 10 meters from the laser line generation device 100. In one or more embodiments, the width of the laser line 166 in a direction perpendicular to the laser line 166 is less than that of a laser line produced by a conventional device. Assuming the power level of the light emitter 106 of the laser line generation device 100 is the same as the power level of a light emitter of a conventional laser line generation device, the laser line 166 laser generated by the line generation device 100 has more energy concentrated per unit area than a laser line generated by a conventional laser line generation device. Accordingly, the laser line 166 may be brighter than a laser line produced by a conventional device. Thus, an operator may be able to more easily perceive the laser line 166 generated by the laser line generation device 100 in a brightly lit area with the than a laser line produced by a conventional device.

Figure 8A:
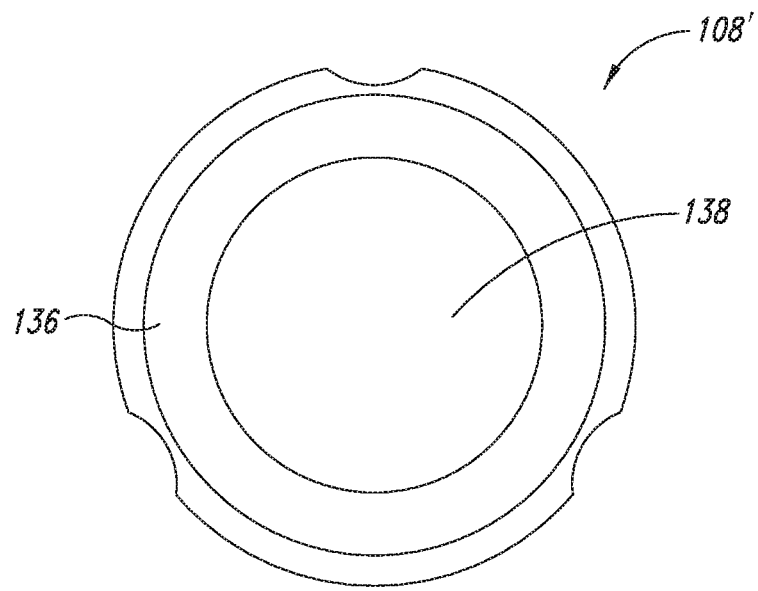
FIG. 8A is a front view of a lens structure including a combination aspheric lens and axicon, according to one or more embodiments of the present disclosure.
Figure 8B:
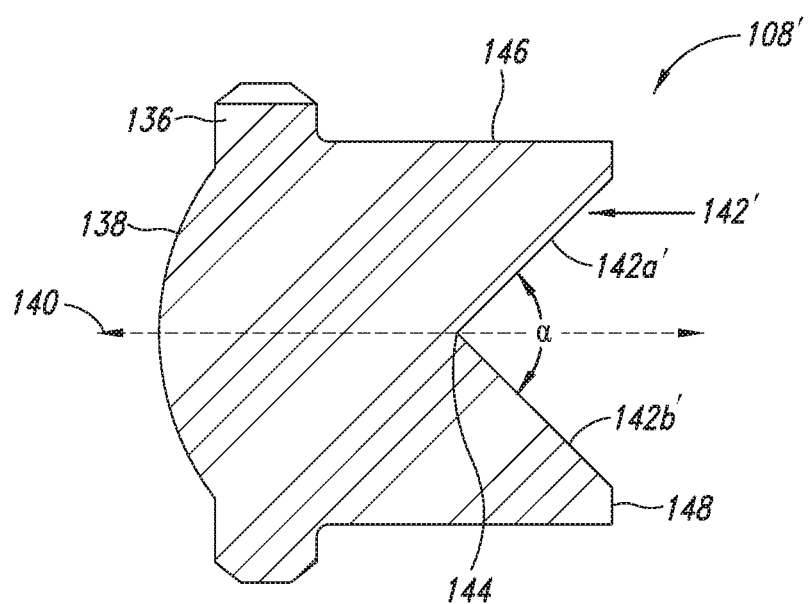
FIG. 8B is a cross-sectional view of the lens structure including the combination aspheric lens and axicon shown in FIG. 8B, according to one or more embodiments of the present disclosure.

FIG. 8A is a front view of a combination aspheric lens and axicon 108', according to one or more embodiments of the present disclosure. FIG. 8B is a cross-sectional view of the combination aspheric lens and axicon 108' shown in FIG. 8B. The combination aspheric lens and axicon 108' shown in FIGS. 8A and 8B is similar in many relevant respects to the combination aspheric lens and axicon 108 shown in FIGS. 4A and 4B, and the same or similar reference numbers are used to describe the same or similar items. In addition, the combination aspheric lens and axicon 108' shown in FIGS. 8A and 8B may be made in a manner similar to that described above for the combination aspheric lens and axicon 108 shown in FIGS. 4A and 4B.

The combination aspheric lens and axicon 108' includes, among other things, a conical surface 142' having a first linear portion 142a' and a second linear portion 142b' that meet at the apex 144, wherein the first linear portion 142a' and the second linear portion 142b' are opposite one another. In one or more embodiments, a length of the first linear portion 142a' is the same as a length of the second linear portion 142b'. In one or more embodiments, the optical axis 140 is an axis of symmetry of the combination aspheric lens and axicon 108'. In one or more embodiments, the optical axis 140 intersects the apex 144 of the conical surface 142'. In one or more embodiments, the light rays emitted by the light emitter 106 experience total internal reflection within the combination aspheric lens and axicon 108'.

Figure 9:
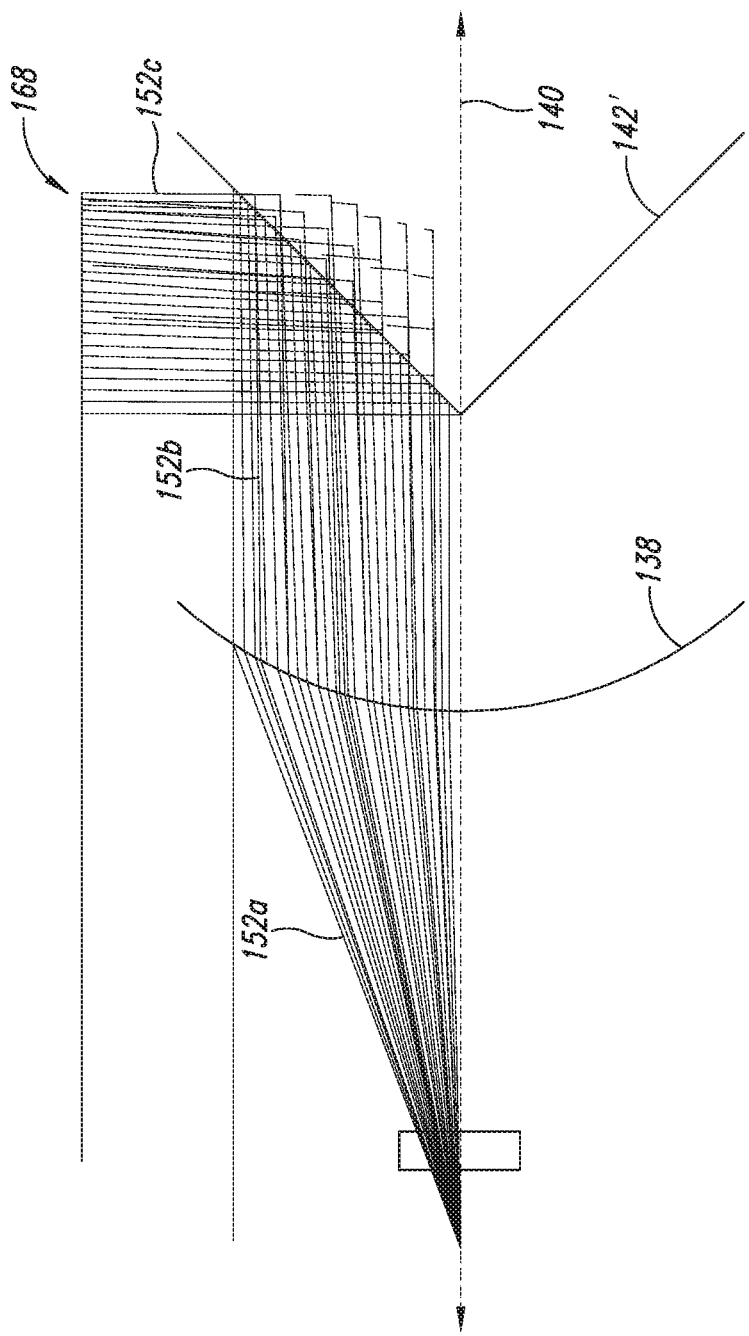
FIG. 9 is an optical model of a lens structure including a combination aspheric lens and axicon, according to one or more embodiments of the present disclosure.

FIG. 9 is a two-dimensional optical model 168 of the combination aspheric lens and axicon 108', according to one or more embodiments of the present disclosure. The optical model 168 includes the light rays 152a, which are emitted by the light emitter 106. The light rays 152a pass through the convex (e.g., aspheric) surface 138 into the combination aspheric lens and axicon 108' where they are collimated, and parallel or collimated light rays 152b travel toward the conical surface 142' and are reflected off of the conical surface 142' toward the side surface 146 (not shown in FIG. 9). Reflected light rays 152c exit the combination aspheric lens and axicon 108' through the side surface 146 (not shown in the optical model 168), and then exit the laser line generation device 100 through the window 112.

In one or more embodiments, the light rays 152c exiting the combination aspheric lens and axicon 108' are substantially perpendicular to the optical axis 140 of the combination aspheric lens and axicon 108'. For example, the light rays 152c exiting the combination aspheric lens and axicon 108' and the optical axis 140 preferably form an angle of 90 degrees, plus or minus 0.1 degree. More preferably, the light rays 152c exiting the combination aspheric lens and axicon 108' and the optical axis 140 form an angle of 90 degrees, plus or minus 0.01 degree. Still more preferably, the light rays 152c exiting the combination aspheric lens and axicon 108' and the optical axis 140 form an angle of 90 degrees.

In one or more embodiments, the light rays 152c exiting the combination aspheric lens and axicon 108' are substantially perpendicular to the light rays 152a entering the combination aspheric lens and axicon 108'. For example, the light rays 152c exiting the combination aspheric lens and axicon 108' and the light rays 152a entering the combination aspheric lens and axicon 108' preferably form an angle of 90 degrees, plus or minus 0.1 degree. More preferably, the light rays 152c exiting the combination aspheric lens and axicon 108' and the light rays 152a entering the combination aspheric lens and axicon 108' form an angle of 90 degrees, plus or minus 0.01 degree. Still more preferably, the light rays 152c exiting the combination aspheric lens and axicon 108' and the light rays 152a entering the combination aspheric lens and axicon 108' form an angle of 90 degrees.

Figure 10:
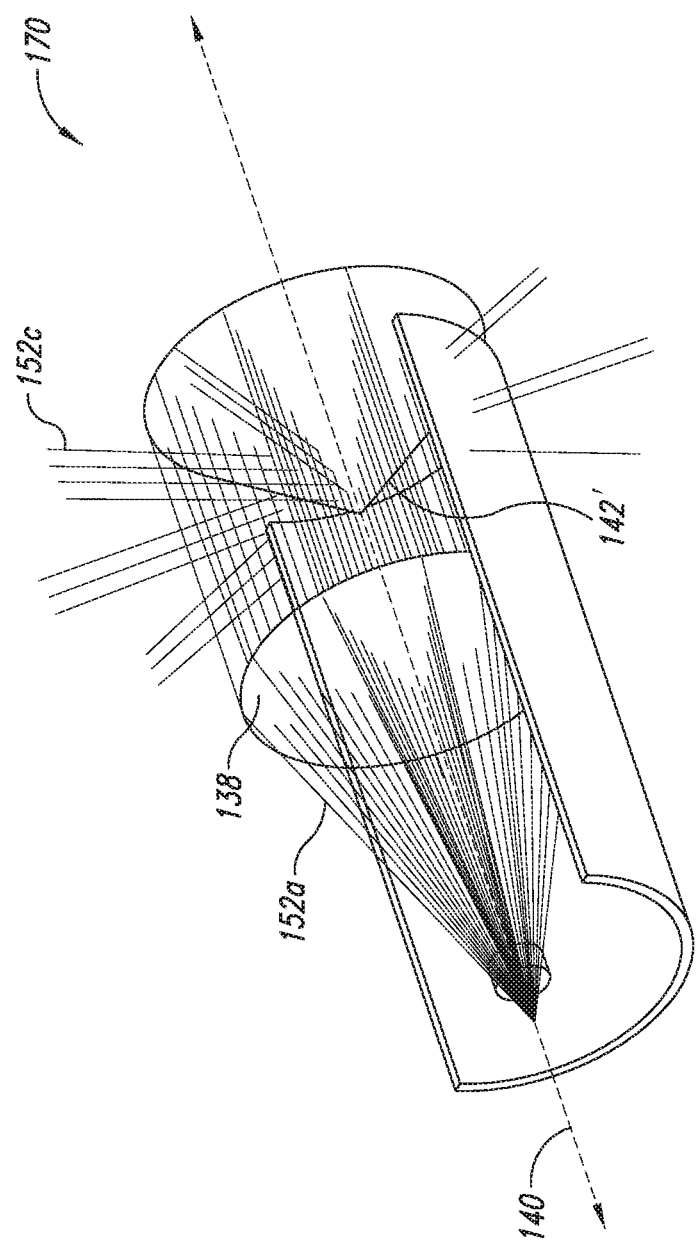
FIG. 10 is another optical model of a lens structure including a combination aspheric lens and axicon, according to one or more embodiments of the present disclosure.

FIG. 10 is a three-dimensional optical model 170 of the combination aspheric lens and axicon 108', according to one or more embodiments of the present disclosure. The optical model 170 is similar in many relevant respects to the optical model 168 shown in FIG. 9. The light rays 152c exiting the combination aspheric lens and axicon 108' travel outwardly in a radial direction from the optical axis 140 as a fan beam. In one or more embodiments, the light rays 152c exiting the combination aspheric lens and axicon 108' span an angular field of view of 360 degrees. The light rays 152c exiting the combination aspheric lens and axicon 108' can form the laser line 166 on the walls 158, 160, and 162 of the room 156 shown in FIG. 7.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
a combination aspheric lens and axicon formed as a unitary lens structure including a convex surface, a conical surface, a side surface, and an annular flange disposed about the outer periphery of the combination aspheric lens and axicon between the convex surface and the side surface, near the front of the combination aspheric lens and axicon, wherein the conical surface tapers inwardly toward the convex surface to an apex of the conical surface that is opposite an interior side of the convex surface, the side surface surrounds the conical surface, and opposite linear portions of the conical surface that meet at the apex of the conical surface form an angle of less than 90 degrees; and
a light emitter which, in operation, emits light rays toward the unitary lens structure, and the light rays pass through the convex surface into the unitary lens structure toward the conical surface, reflect off of the conical surface toward the side surface, and exit the unitary lens structure through the side surface.

2. The device according to claim 1 wherein the light rays exiting the unitary lens structure through the side surface are substantially perpendicular to an optical axis of the unitary lens structure.

3. The device according to claim 1 wherein the light rays exiting the unitary lens structure are substantially perpendicular to the light rays entering the unitary lens structure.

4. The device according to claim 1 wherein the unitary lens structure collimates the light rays that pass through the convex surface, and the collimated light rays reflect off of the conical surface toward the side surface.

5. The device according to claim 1 wherein the angle formed by the opposite linear portions of the conical surface that meet at the apex of the conical surface is greater than 88 degrees and is less than 89 degrees.

6. The device according to claim 1 wherein the side surface has a tapered shape that tapers inwardly toward the convex surface.

7. The device according to claim 1 wherein an optical axis of the unitary lens structure intersects the apex of the conical surface.

8. The device according to claim 1 wherein an optical axis of the unitary lens structure does not intersect the apex of the conical surface.

9. The device according to claim 1 wherein the unitary lens structure includes an end surface that extends from the side surface to the conical surface.

10. The device according to claim 1 wherein the convex surface is an aspheric surface, and the light emitter is a laser emitter.

11. A laser line generation device, comprising:
a combination aspheric lens and axicon formed as a unitary lens structure including an aspheric surface, a conical surface, a side surface, and an annular flange disposed about the outer periphery of the combination aspheric lens and axicon between the aspheric surface and the side surface, near the front of the combination aspheric lens and axicon, wherein the conical surface tapers inwardly toward the aspheric surface to an apex of the conical surface that is opposite an interior side of the aspheric surface, and opposite linear portions of the conical surface that meet at the apex of the conical surface form an angle of less than 90 degrees; and
a laser emitter which, in operation, emits light rays toward the unitary lens structure, and the light rays pass through the aspheric surface into the unitary lens structure, reflect off of the conical surface, and exit the unitary lens structure through the side surface.

12. The laser line generation device according to claim 11 wherein the light rays exiting the unitary lens structure through the side surface are substantially perpendicular to an optical axis of the unitary lens structure.

13. The laser line generation device according to claim 11 wherein the light rays exiting the unitary lens structure are substantially perpendicular to the light rays entering the unitary lens structure.

14. The laser line generation device according to claim 11 wherein the unitary lens structure collimates the light rays that pass through the aspheric surface, and the collimated light rays reflect off of the conical surface toward the side surface.

15. The laser line generation device according to claim 11 wherein the angle formed by the opposite linear portions of the conical surface that meet at the apex of the conical surface is greater than 88 degrees and less than 89 degrees.

16. The laser line generation device according to claim 11 wherein the side surface has a tapered shape that tapers inwardly toward the convex surface.

17. The laser line generation device according to claim 11 wherein an optical axis of the unitary lens structure intersects the apex of the conical surface.

18. The laser line generation device according to claim 11 wherein an optical axis of the unitary lens structure does not intersect the apex of the conical surface.

19. The laser line generation device according to claim 11 wherein the unitary lens structure includes an end surface that extends from the side surface to the conical surface.

20. The laser line generation device according to claim 11 wherein the unitary lens structure includes a flange disposed between the aspheric surface and the side surface.

* * * * *